United States Patent
Allard et al.

(10) Patent No.: US 12,480,830 B2
(45) Date of Patent: *Nov. 25, 2025

(54) FEATURE IN VACUUM INSULATED STRUCTURE TO ALLOW PRESSURE MONITORING

(71) Applicant: WHIRLPOOL CORPORATION, Benton Harbor, MI (US)

(72) Inventors: Paul B. Allard, Coloma, MI (US); Sai B. Krishna, Pune (IN); Abhay Naik, Stevensville, MI (US); Sanjesh Kumar Pathak, Stevensville, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 206 days.

This patent is subject to a terminal disclaimer.

(21) Appl. No.: 18/349,387

(22) Filed: Jul. 10, 2023

(65) Prior Publication Data

US 2023/0349784 A1 Nov. 2, 2023

Related U.S. Application Data

(63) Continuation of application No. 17/551,933, filed on Dec. 15, 2021, now Pat. No. 11,761,839, which is a continuation of application No. 16/581,962, filed on Sep. 25, 2019, now Pat. No. 11,248,979.

(51) Int. Cl.
*G01L 19/08* (2006.01)
*G01L 1/04* (2006.01)

(52) U.S. Cl.
CPC .............. *G01L 19/086* (2013.01); *G01L 1/04* (2013.01); *F25D 2201/14* (2013.01); *F25D 2700/00* (2013.01)

(58) Field of Classification Search
CPC ..... G01L 19/086; G01L 1/04; F25D 2201/14; F25D 2700/00; F25D 23/06; F25D 23/02; F25D 23/062; F25D 23/065; F25D 11/02; F25D 29/005; F25D 29/006; F25D 2323/021; Y02B 40/00
See application file for complete search history.

(56) References Cited

U.S. PATENT DOCUMENTS

| | | | |
|---|---|---|---|
| 4,484,818 A | 11/1984 | Houston | |
| 4,783,971 A * | 11/1988 | Alba | F25D 21/14 312/334.44 |
| 5,082,335 A | 1/1992 | Cur et al. | |
| 5,512,345 A | 4/1996 | Tsutsumi et al. | |
| 6,109,712 A | 8/2000 | Haworth | |
| 7,316,125 B2 | 1/2008 | Uekado | |

(Continued)

FOREIGN PATENT DOCUMENTS

| CN | 105004478 A | 10/2015 |
|---|---|---|
| CN | 106662375 A | 5/2017 |

(Continued)

*Primary Examiner* — Emmanuel E Duke
(74) *Attorney, Agent, or Firm* — Price Heneveld LLP

(57) ABSTRACT

An appliance includes a metallic liner and an outer metallic wrapper. An insulating cavity is defined between the metallic liner and outer metallic wrapper. The appliance further includes a pressure sensing device disposed within the cavity. The pressure sensing device is located to detect a pressure status and transmit the pressure status through at least one of the metallic liner and outer metallic wrapper.

20 Claims, 5 Drawing Sheets

(56) References Cited

U.S. PATENT DOCUMENTS

| | | |
|---|---|---|
| 7,752,889 B2 | 7/2010 | O'Leary et al. |
| 7,775,115 B2 | 8/2010 | Theuss et al. |
| 8,944,541 B2 | 2/2015 | Allard et al. |
| 8,986,805 B2 | 3/2015 | Yoon et al. |
| 9,441,779 B1 | 9/2016 | Alshourbagy et al. |
| 9,476,635 B2 | 10/2016 | Nelson |
| 9,791,205 B2 | 10/2017 | Mukherjee et al. |
| 10,041,724 B2 | 8/2018 | Allo et al. |
| 10,598,423 B2 | 3/2020 | Keller et al. |
| 10,710,196 B2 | 7/2020 | Azuma et al. |
| 11,168,935 B2 | 11/2021 | Wong et al. |
| 11,248,979 B2 | 2/2022 | Allard et al. |
| 2008/0078245 A1 | 4/2008 | O'Leary et al. |
| 2008/0227235 A1* | 9/2008 | Theuss ............ G01L 19/086 438/53 |
| 2009/0031659 A1 | 2/2009 | Kalfon |
| 2012/0297813 A1 | 11/2012 | Hanley et al. |
| 2015/0377544 A1 | 12/2015 | Nelson |
| 2016/0258671 A1 | 9/2016 | Allard et al. |
| 2017/0122627 A1 | 5/2017 | Kerstner et al. |
| 2017/0159995 A1* | 6/2017 | Allo ............ F16L 59/065 |
| 2017/0227278 A1* | 8/2017 | Keller ............ F25D 23/126 |
| 2017/0247169 A1 | 8/2017 | Losco |
| 2018/0023880 A1 | 1/2018 | Kerstner et al. |
| 2019/0101245 A1 | 4/2019 | Romanos et al. |

FOREIGN PATENT DOCUMENTS

| | | |
|---|---|---|
| CN | 109312889 A | 2/2019 |
| DE | 10117021 | 10/2002 |
| GB | 1293561 | 10/1972 |
| JP | 10239199 | 9/1998 |
| JP | 2007283989 | 11/2007 |
| JP | 2012051647 | 3/2012 |
| JP | 2012136254 | 7/2012 |
| JP | 2012180904 | 9/2012 |
| KR | 101718710 | 3/2017 |
| WO | 2012017903 | 2/2012 |
| WO | WO-2018164591 A1 * | 9/2018 ............ F25D 23/06 |

* cited by examiner

FEATURE IN VACUUM INSULATED STRUCTURE TO ALLOW PRESSURE MONITORING

CROSS-REFERENCE TO RELATED APPLICATION

The present application is a continuation of U.S. patent application Ser. No. 17/551,933 filed Dec. 15, 2021, now U.S. Pat. No. 11,761,839, which is a continuation of U.S. patent application Ser. No. 16/581,962 filed Sep. 25, 2019, now U.S. Pat. No. 11,248,979, both of which are entitled FEATURE IN VACUUM INSULATED STRUCTURE TO ALLOW PRESSURE MONITORING, the entire disclosures of which are hereby incorporated herein by reference.

FIELD OF THE DISCLOSURE

The present disclosure generally relates to a vacuum insulated structure, and more specifically, to a pressure sensing device within the vacuum insulated structure that detects a pressure status and transmits the pressure status through at least one steel panel of the vacuum insulated structure.

BACKGROUND OF THE DISCLOSURE

Appliances such as refrigerators often include an insulated structure that includes a steel liner and an outer steel wrapper. An insulating cavity can be maintained at a desired air pressure between the steel liner and the outer steel wrapper. Pressure sensors have been used within the insulating cavity to deliver a signal via a wired connection to communicate the information about the insulating cavity.

SUMMARY OF THE DISCLOSURE

According to one aspect of the present disclosure, an appliance includes a metallic liner, an outer metallic wrapper, and an insulating cavity defined between the metallic liner and the outer metallic wrapper. The appliance further includes a pressure sensing device that is disposed within the insulating cavity. The pressure sensing device is located to detect a pressure status. The pressure status is transmitted through at least one of the metallic liner and the outer metallic wrapper. The pressure status is one of a deflection and a gas-related reading.

According to another aspect of the present disclosure, a vacuum insulated structure for thermal insulation in a refrigerating appliance includes a metallic liner and an outer metallic wrapper. The outer metallic wrapper is coupled to the metallic liner to define an insulated cabinet having an interior surface. The vacuum insulated structure further includes a window that is sealedly coupled to an opening defined by the insulated cabinet. The vacuum insulated structure further includes a pressure sensing device that is coupled to at least one of the metallic liner and the outer metallic wrapper. The pressure sensing device is disposed proximate the window and transmits a signal through the window to a receiver.

According to yet another aspect of the present disclosure, a vacuum insulated structure for thermal insulation in a refrigerating appliance includes a structural cabinet that includes an outer steel wrapper, a steel liner, and an insulating cavity therewithin. Additionally, the vacuum insulated structure includes at least one strain gauge attached to an interior surface of the structural cabinet and within the insulating cavity. The strain gauge transmits a signal through one of the outer steel wrapper and steel liner via a wireless network. The signal is transmitted to at least one of a control board and receiver.

These and other features, advantages, and objects of the present disclosure will be further understood and appreciated by those skilled in the art by reference to the following specification, claims, and appended drawings.

Figure 1:
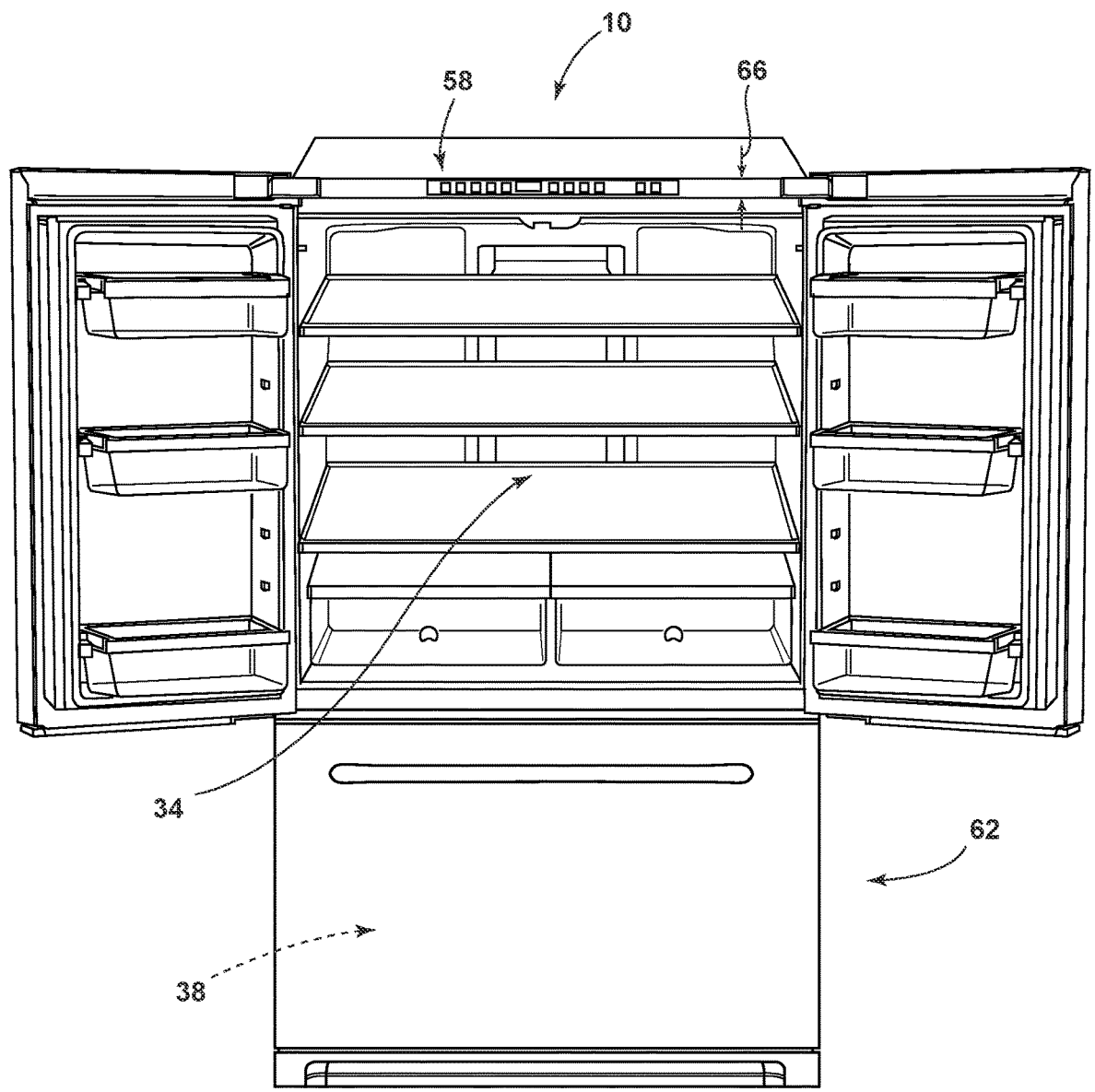
FIG. 1 is a front perspective view of an appliance, according to one example.

The components in the figures are not necessarily to scale, emphasis instead being placed upon illustrating the principles described herein.

DETAILED DESCRIPTION

The present illustrated embodiments reside primarily in combinations of method steps and apparatus components related to a pressure sensing device used to monitor the pressure within a vacuum insulated structure. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

Referring to FIGS. 1-6, reference numeral 10 generally designates an appliance that includes a steel liner 14, an outer steel wrapper 18, and an insulating cavity 22. The insulating cavity 22 is defined between the steel liner 14 and the outer steel wrapper 18. The appliance 10 also includes a pressure sensor 26 that is disposed within the insulating cavity 22. The pressure sensor 26 is configured to detect a pressure status 130 of the insulating cavity 22. The pressure sensor 26 transmits the pressure status 130 through at least one of the steel liner 14 and outer steel wrapper 18. The pressure status 130 is typically one of a deflection and a gas-related reading.

Referring to FIG. 1, the appliance 10 is illustrated as a refrigerator having a structural cabinet 30, where the structural cabinet 30 is also an insulated cabinet 30, defining refrigerating and freezing compartments 34, 38. While illustrated as a bottom mount refrigerator, the appliance 10 may be, for example, a bottom mount French door refrigerator, a top mount refrigerator, a side-by-side refrigerator, a 4-door French door refrigerator, and/or a 5-door French door refrigerator. Further, the present disclosure is not limited to refrigerators. Appliances 10 incorporating the pressure sensor 26 may be, for example, freezers, coolers, ovens, dishwashers, laundry appliances, counter top appliances, water heaters, vacuum insulated structures, and other similar appliances and fixtures within household and commercial settings.

Figure 2:
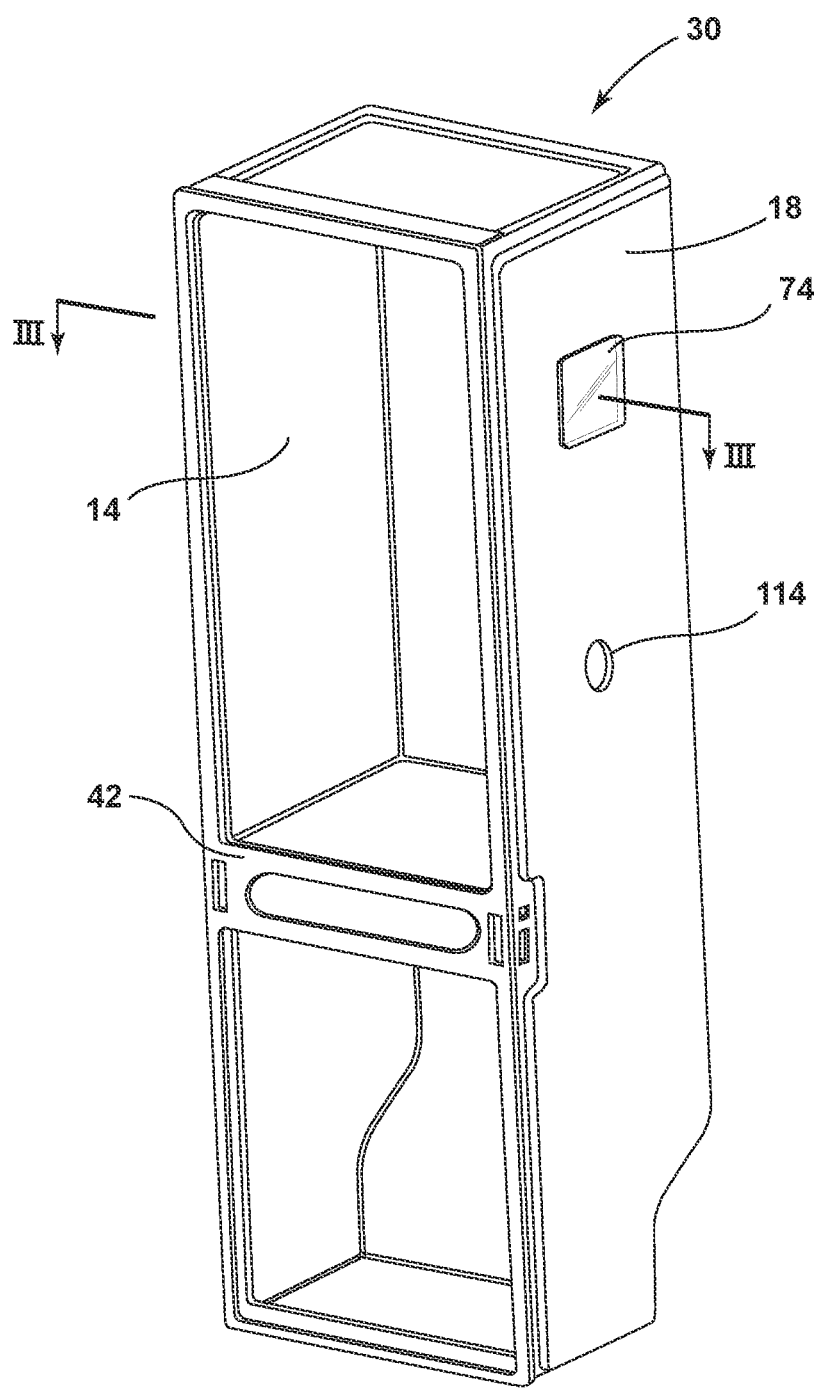
FIG. 2 is a perspective view of a cabinet of an appliance, according to one example.

The appliance 10 is illustrated in FIGS. 1 and 2 as an insulating appliance 10, which includes at least the trim breaker 42, the outer steel wrapper 18, and the steel liner 14. The outer steel wrapper 18 may include a plurality of outer steel wrapper panels and the steel liner 14 may include a plurality of steel liner panels. However, in alternate configurations of the appliance 10, panels of the appliance 10 (e.g., the trim breaker 42, the plurality of outer steel wrapper panels, and the plurality of steel liner panels) may be configured as other components. The outer steel wrapper 18 and the steel liner 14 may be coupled to the trim breaker 42 to define an insulating cavity 22 in which one or more insulation materials 146 may be disposed. The insulation materials 146 may be carbon-based powder and/or silicon oxide based materials, however, it is generally contemplated that other insulation materials 146 may be used. Additionally, the insulation materials 146 may be free-flowing materials that can be poured, blown, compacted, or otherwise disposed within the insulating cavity 22. This free-flowing material may be in the form of various silica-based materials, such as fumed silica, precipitated silica, nano-sized and/or micro-sized aerogel powder, rice husk ash powder, perlite, glass spheres, hollow glass spheres, cenospheres, diatomaceous earth, combinations thereof, and any other similar insulating particulate material. The one or more insulation materials 146 may substantially fill the insulating cavity 22, forming a substantially continuous layer between the outer steel wrapper 18 and the steel liner 14.

A vacuum 54, typically a partial vacuum 54, may be defined within the insulating cavity 22 where the vacuum 54 defines a pressure differential 58 between an exterior 62 of the appliance 10 and the insulating cavity 22. This pressure differential 58 serves to define an inward compressive force 66 that is exerted upon both the outer steel wrapper 18 and the steel liner 14, and tends to bias the outer steel wrapper 18 and the steel liner 14 toward the insulating cavity 22 of the appliance 10. The vacuum 54 within the insulating cavity 22 also tends to cause gas to infiltrate into the insulating cavity 22 from an area exterior to the appliance 10. This infiltration of gas is sometimes referred to as gas permeation. The infiltration of gas degrades the vacuum 54 and decreases the thermal performance of the structural cabinet 30.

Referring to FIG. 2, the outer steel wrapper 18 and the steel liner 14 may be configured to form the insulated cabinet 30 of the appliance 10. In this way, the outer steel wrapper 18 has a three-dimensional shape and defines a central, insulating cavity 22. The steel liner 14 may correspond with the outer steel wrapper 18 and may have a plurality of surfaces on the plurality of outer steel wrapper panels that define an insulating cavity 22. It is generally contemplated that the steel liner 14 may be received within the insulating cavity 22 of the outer steel wrapper 18, thus partially defining the insulating cavity 22. Additionally, the outer steel wrapper 18 and the steel liner 14 may include materials capable of, at least partially, resisting, bending, biasing, or otherwise being formed in response to the inward compressive force 66. These materials for the trim breaker 42, outer steel wrapper 18, and steel liner 14 may include, but are not limited to, metals, plastics, polymers, metal alloys, combinations thereof, and other similar substantially rigid materials that can be used for vacuum insulated structures within appliances 10.

It is contemplated that the trim breaker 42 may be coupled to outer edges of the outer steel wrapper 18 and the steel liner 14. As illustrated in FIG. 2, the trim breaker 42 has a generally rectangular shape that wraps around the outer surface of the outer steel wrapper 18, however, it is contemplated that other geometric shapes known in the art may be used. In this way, the trim breaker 42 may not substantially interfere with access to the refrigerating and freezing compartments 34, 38 defined by the cabinet 30. A channel may be defined around a perimeter of the trim breaker 42. The channel may be configured to receive the outer edges of the outer steel wrapper 18 and the steel liner 14. It is also contemplated that the trim breaker 42 may define more than one channel to accommodate the outer steel wrapper 18 and the steel liner 14 in separate channels. The channel may be filled with an adhesive configured to couple the outer steel wrapper 18 and the steel liner 14 with the trim breaker 42.

The cabinet 30 may define both refrigerating and freezing compartments 34, 38. The refrigerating and freezing compartments 34, 38 may include a plurality of shelves, drawers, or other storage apparatuses that allow a user to store foodstuff. The insulating cavity 22 may protect the foodstuff within the refrigerating and freezing compartments 34, 38 from being spoiled by the environment surrounding the appliance 10. Furthermore, a user may independently control the temperature within the refrigerating and freezing compartments 34, 38 for optimal storage conditions.

Figure 3:
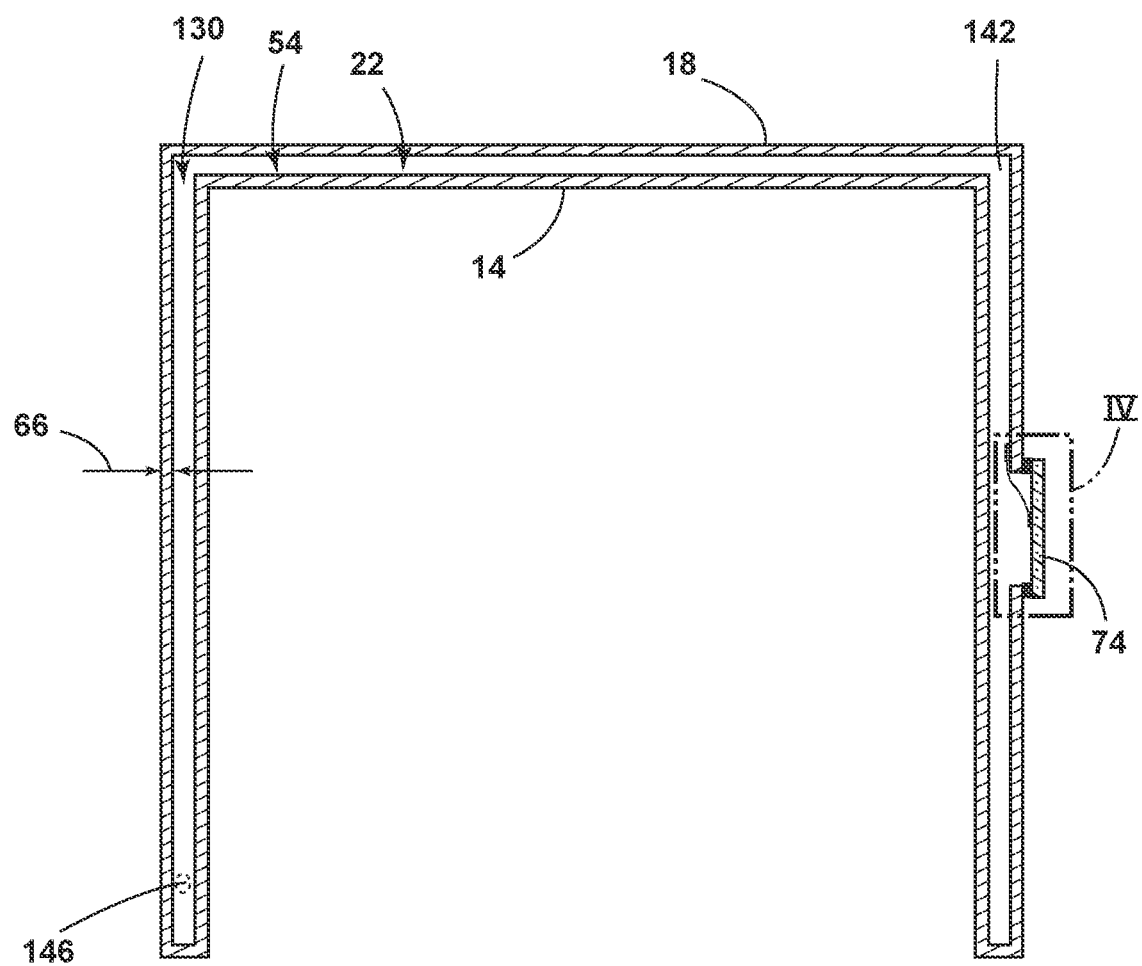
FIG. 3 is a schematic cross-sectional view of an insulated cabinet of an appliance defined by an outer steel wrapper and a steel liner, taken along line III-III.

Referring to FIG. 3, the outer steel wrapper 18 and steel liner 14 may define an at least partially insulating cavity 22. As illustrated, the insulating cavity 22 has a generally rectangular cross section, however, it is contemplated that other geometric shaped cross sections known in the art may be used. The insulating cavity 22 is typically large enough to contain a pressure sensor 26, transmitter 82, wire 86, and other devices. In one embodiment, the insulating cavity 22 may include at least one pressure sensor 26. In another embodiment, the insulating cavity 22 may include at least one pressure sensor 26 and/or strain gauge 118. The pressure sensor 26 may be coupled to a window 74 over an opening 78 in one of the steel liner 14 and outer steel wrapper 18. Alternatively, the pressure sensor 26 may be connected to a transmitter 82 via wire 86 so the transmitter 82 may transmit a wireless signal 126 through the window 74. The transmitter 82 may be located proximate the window 74 for optimal transmission of signal 126 through the window 74. In another embodiment, the pressure sensor 26 may include an antenna 122 that aids in transmitting the signal 126 through the window 74. The strain gauge 118 may also include an antenna 122 and/or a wire 86 that connects to a transmitter 82. In such an embodiment, the transmitter 82 can be positioned at the window 74 and the strain gauge 118 can be positioned elsewhere in the insulating cavity 22, such as a point of highest strain 142, and be connected to the transmitter 82 via the wire 86, as will be described more fully below.

Referring to FIG. 2, the outer steel wrapper 18 may include a window 74 that covers an opening 78 in the structural cabinet 30. The opening 78 may be any one of a variety of geometric shapes and may be formed from any one of a variety of methods such as stamping, cutting or drilling. The material for the window 74 may include a plurality of materials and coatings that limit gas permeation. In one embodiment, the window 74 may be glass or plastic. In another embodiment, the window 74 may be plastic that has been treated with a coating that reduces gas permeation. The window 74 may be positioned over the opening 78 on at least one of the outer steel wrapper 18, steel liner 14, and trim breaker 42. The window 74 may have a geometric shape that covers the opening 78, and may further include a flange, groove, rib, or other feature that aids in coupling the window 74 to the outer steel wrapper 18 or steel liner 14.

Furthermore, the window 74 may be configured for a wireless signal 126 to pass therethrough. Unlike the steel liner 14 and outer steel wrapper 18, where a consistent signal strength is difficult to achieve through the steel material, a transmitter 82 may transmit a wireless signal 126 through a window 74 that includes glass or plastic material. Glass and plastics generally have a higher signal transmissivity than metals and typically permit electromagnetic waves to pass therethrough. It is contemplated that other materials known in the art with high signal transmissivity may be used for the window 74.

Figure 4:
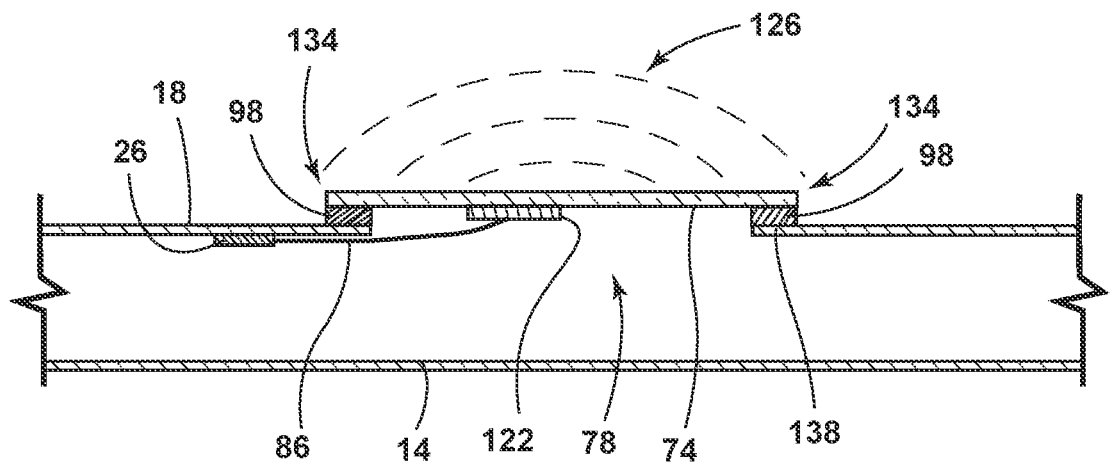
FIG. 4 is an enlarged cross-sectional view of the insulated cabinet of FIG. 3, taken at area IV, and showing the window overlap joint coupling to an outer steel panel.

Referring to FIG. 4, the window 74 may be placed over an opening 78 defined by the outer steel wrapper 18, as illustrated. Alternatively, the window 74 may be placed over an opening 78 defined by the steel liner 14. The opening 78 may have a rectangular shape as illustrated, or any other shape that the window 74 may sealedly couple to. In one embodiment, the edges of the window 74 may overhang the opening 78 so the window 74 may fully cover the opening 78 and form an overlap joint 134. The window 74 may be sealedly coupled to the opening 78 by a bead of sealant 98 that both adheres the window 74 to the opening 78 and limits gas permeation through the window 74. The sealant 98 may be any one or combination of a variety of sealants that sealedly couple the window 74 to the opening 78 and limit gas permeation over an extended period of time.

Figure 5:
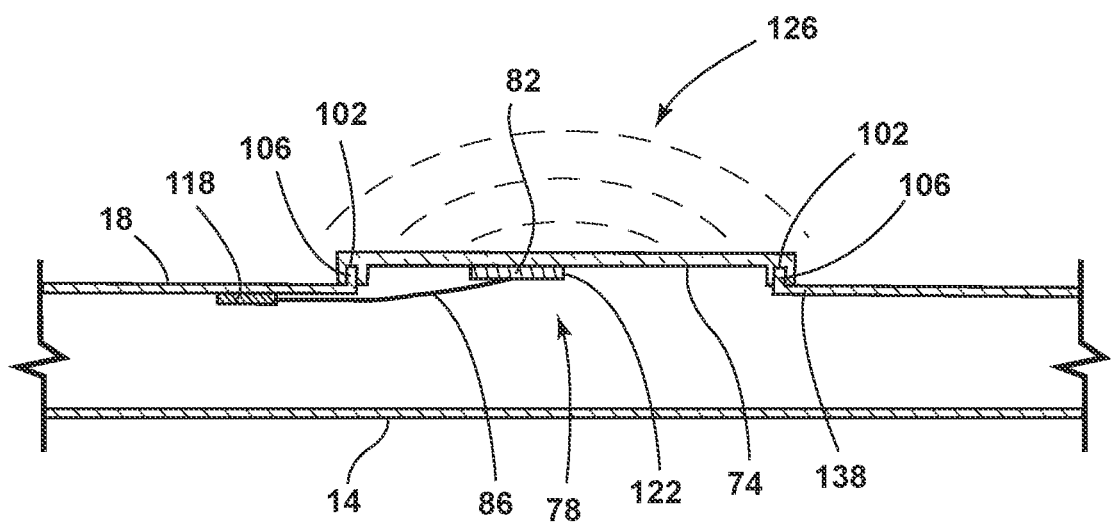
FIG. 5 is an enlarged cross-sectional view of an aspect of the window with a groove coupling to an outer steel panel with a flange.

Referring to FIGS. 4-5, a window 74 may be placed over an opening 78 defined by the outer steel wrapper 18. The window 74 may include at least one groove 102 that accepts a corresponding flange 106 disposed on an interior surface of the cabinet 30 defined by the outer steel wrapper 18 and steel liner. The groove 102 can be cut or etched within the glass or formed as a lip of the window 74. Other groove forming methods known in the art may alternatively be used to form the groove 102. The flange 106 may protrude away from the interior surface of the cabinet 30 and may be located proximate the edge 138 of the opening 78. The flange 106 may be of a rectangular shape as illustrated, or it may be of another shape that mates with the corresponding groove 102 and positions the window 74. The groove 102 may accept the flange 106 to position the window 74 over the opening 78. The window 74 may be further sealed to the opening 78 by a bead of sealant 98 applied in the groove 102 to further limit gas permeation when the groove 102 accepts the flange 106.

Alternatively, the window 74 may be incorporated into the trim breaker 42 and/or pass through 114 using an overlap joint 134, groove 102 and flange 106, or other attachment method. The trim breaker 42 and pass through 114 generally include materials that have low gas permeability such as plastic coated with a permeation limiting coating. The pressure sensor 26 may be configured to transmit a pressure status 130 to a transmitter 82 via wire 86, as described more fully herein, and the transmitter 82 may be configured to transmit a wireless signal 126 through the plastic or other low gas permeability material found in the trim breaker 42 and/or pass through 114. In another embodiment, the pressure sensor 26 may transmit the signal 126 wirelessly via Wi-Fi or a cloud-based network to a receiver.

As illustrated in FIGS. 4-5, a transmitter 82 may be coupled to the window 74 to allow optimal transmission of a wireless signal 126 containing a pressure status 130 through the window 74 to a user or to a refrigerator control board. In another embodiment, the transmitter 82 may be positioned elsewhere within the insulating cavity 22 and may transmit a wireless signal 126 through the window 74. The transmitter 82 may be coupled to the window 74 or other surface of the steel liner 14 or outer steel wrapper 18 by a suitable adhesive or other attachment method. The transmitter 82 is typically coupled or near to the window 74 for optimal transmission of signal 126 through the window 74. A pressure sensor 26 and/or strain gauge 118 is typically located at an optimal point within the insulating cavity 22 to record a desired pressure status 130 and to transmit the pressure status 130 to the transmitter 82 via wire 86. The pressure sensor 26 and/or strain gauge 118 may be positioned at any location within the insulating cavity 22 to detect a pressure status 130 and may transmit the pressure status 130 by either a wire 86 or a wireless connection to a receiver that is positioned within the insulating cavity 22, within the cabinet 30, or outside the appliance 10.

The pressure sensor 26 may be a force collector type that measures strain in a surface caused by an applied force over a given area. The pressure sensor 26 may also be an electronic pressure sensor that senses properties—such as density—to infer gas pressures. In other embodiments, the pressure sensor 26 may be an optical sensor, resonant sensor, thermal sensor, ionization sensor, piezoelectric sensor, capacitive sensor, electromagnetic sensor, or other pressure sensor type that senses a deflection or other gas-related reading and pairs with a transmitter 82 to transmit the reading to a user. The pressure sensor 26 may be positioned at any location within the insulating cavity 22 to detect the gas pressure. The pressure sensor 26 may be attached to the steel liner 14 and/or outer steel wrapper 18 by using at least one of a suitable attachment method. These methods consist of, but are not limited to, adhesive bonding and mechanical fastening.

Alternatively, the pressure sensor 26 may be a strain gauge 118. In one embodiment, the strain gauge 118 may be positioned at the point of highest strain 142 within the insulating cavity 22. The point of highest strain 142 may be at a corner of the insulating cavity 22 as illustrated, or at another location. The strain gauge 118 is typically located on an outside surface of the cabinet 30; however, it may be positioned at another point within the cabinet 30. The strain gauge 118 may be attached to the outer steel wrapper 18 and/or steel liner 14 by a suitable adhesive or other suitable attachment method. The strain gauge 118 may be a foil strain gauge that causes a change in electrical resistance, semiconductor strain gauge, piezoresistor, microscale strain gauge, or any other type of strain gauge that measures strain within the outer steel wrapper 18 and/or steel liner 14 caused by a pressure differential 58, and transmits the strain reading to a receiver.

The pressure sensor 26 may transmit a wireless signal 126 containing a pressure status 130 using a transmitter 82 that is attached to the pressure sensor 26 via wire 86. The transmitter 82 may include an antenna 122 and may generate a radio frequency alternating current to transmit the wireless signal 126 through a window 74 to a receiver. In another embodiment, the pressure sensor 26 may wirelessly transmit a signal via Wi-Fi to a refrigerator control board and/or receiver. The pressure sensor 26 may further connect to a cloud-based network and relay the pressure status to the cloud-based network. A user may connect to the cloud-based network via a cloud-accessible device to determine the pressure status at a past time, present time, or projected future time. The refrigerator control board may also be connected to the cloud-based network and may receive the pressure status at a given time. The refrigerator control board may then generate an alert about a change in pressure within the insulating cavity 22, or it may perform another function related to the pressure status 130 within the insulating cavity 22.

Figure 6:
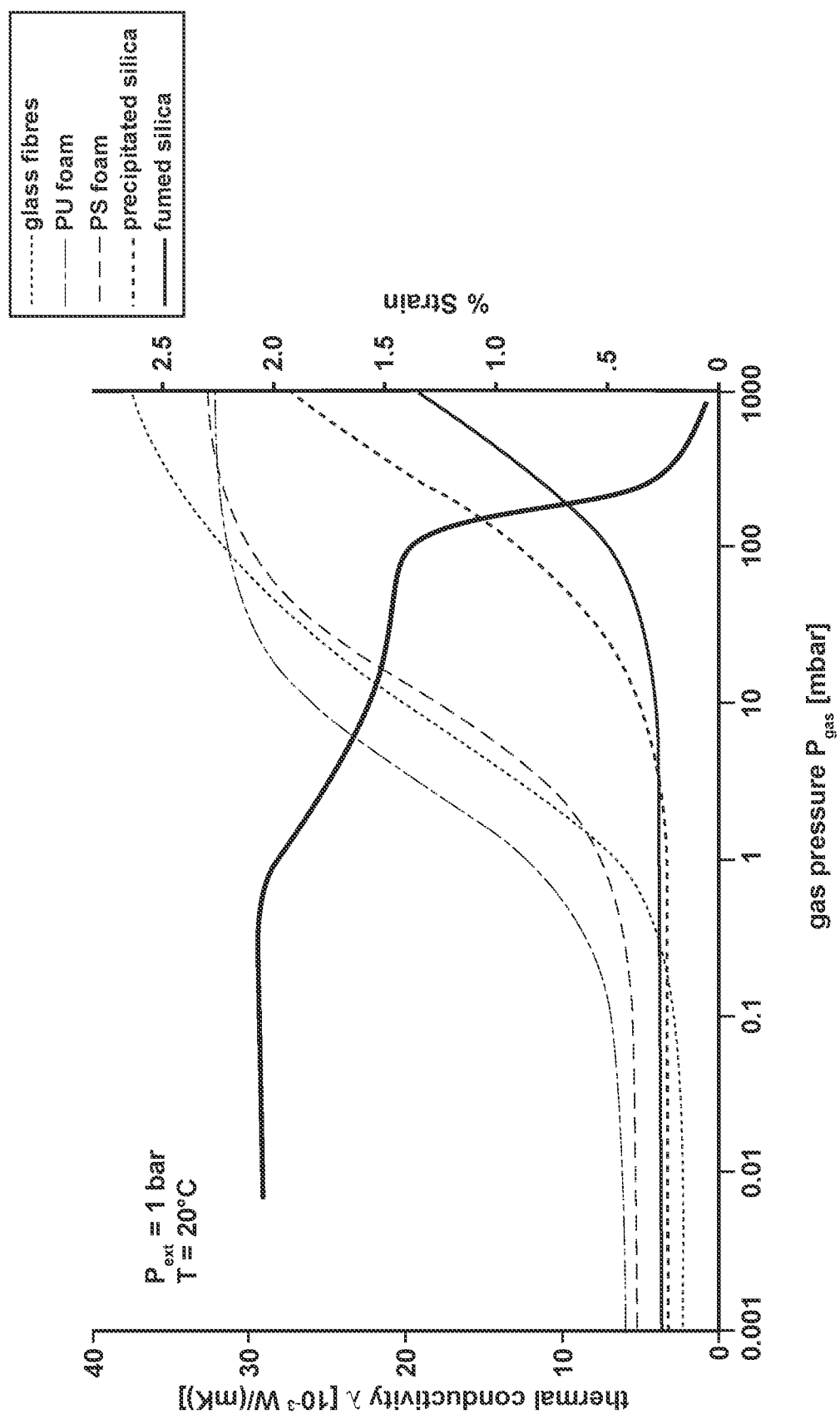
FIG. 6 is a graph showing the relationship between thermal conductivity, gas pressure, and percent strain.

Referring to FIG. 6, the general relation of thermal conductivity, gas pressure, and percent strain is shown. Thermal conductivity generally has an inverse relationship with percent strain as pressure increases. As the gas pressure within the cavity increases, thermal conductivity generally increases and percent strain generally decreases. This relationship indicates that as the pressure within the insulating cavity 22 increases, materials generally experience a higher thermal conductivity and hence, are more likely to allow heat to pass through. Additionally, as pressure increases, percent strain generally decreases. Hence, as the pressure differential 58 surrounding the appliance 10 changes, the strain in the outer steel wrapper 18 and steel liner 14 changes. These changes within the cabinet 50 and the insulating cavity 22 are monitored and transmitted by the pressure 26 and the transmitter 82.

Use of the present disclosure may provide a variety of advantages. For example, the wireless signal 126 sent from the transmitter 82 may alert a user, such as a service technician, of a loss in pressure within the insulating cavity 22. This loss of pressure could cause the refrigeration and air handling systems within the appliance to operate more frequently and use more resources to maintain a desired temperature. Additionally, the wireless signal 126 could alert a user of a pressure increase within the insulating cavity 22. This pressure increase may indicate an issue with the insulation material 146 within the insulating cavity 22 or an issue with the steel liner 14 or outer steel wrapper 18 that could result in degradation in the thermal performance of the appliance and a much more inefficient level of operation. Alternatively, the pressure status 130 may be sent to the refrigerator control board. The refrigerator control board may then modify the refrigeration cycle to account for the changed conditions within the insulating cavity 22 to provide optimal storage conditions.

In use, a user will be able to open refrigerator doors to access refrigerating and freezing compartments and to store foodstuff within the compartments. The foodstuff may be kept at an ideal temperature for maximum storage life at least in part because of the thermally insulated cavity between the steel liner and outer steel wrapper. A user may monitor the conditions within the compartments based on a pressure status from a pressure sensing device that transmits the pressure status via wireless signal 126 through a window to a receiver. A user may then make necessary adjustments to the control systems of the refrigerator to achieve the desired conditions within the refrigerating and freezing compartments.

According to another aspect of the present disclosure, an appliance includes a metallic liner, an outer metallic wrapper, and an insulating cavity defined between the metallic liner and the outer metallic wrapper. The appliance further includes a pressure sensing device that is disposed within the insulating cavity. The pressure sensing device is located to detect a pressure status. The pressure status is transmitted through at least one of the metallic liner and the outer metallic wrapper. The pressure status is one of a deflection and a gas-related reading.

According to another aspect of the present disclosure, the metallic liner is made of steel and defines at least one thermally insulated compartment of a refrigeration unit.

According to yet another aspect of the present disclosure, the metallic liner and the metallic outer wrapper are made of steel, and the pressure sensing device is paired with a transmitter that is configured to transmit the pressure status through at least one of the metallic liner and the outer metallic wrapper.

According to another aspect of the present disclosure, the insulating cavity defines an at least partial vacuum.

According to another aspect of the present disclosure, a plastic trim breaker couples the outer metallic wrapper and the metallic liner to define a vacuum insulated structure having the insulating cavity therein.

According to yet another aspect of the present disclosure, the pressure sensing device detects a change in the metallic liner or the outer metallic wrapper caused by a change in an amount of gas within the insulating cavity, wherein the pressure status is a pressure-related reading.

According to another aspect of the present disclosure, the pressure sensing device is attached to the metallic liner, and the pressure status is a deflection-related reading.

According to another aspect of the present disclosure, the pressure sensing device transmits a wireless signal of the pressure status to at least one of a refrigerator control board and a receiver.

According to yet another aspect of the present disclosure, a vacuum insulated structure for thermal insulation in a refrigerating appliance includes a metallic liner and an outer metallic wrapper. The outer metallic wrapper is coupled to the metallic liner to define an insulated cabinet having an interior surface. The vacuum insulated structure further includes a window that is sealedly coupled to an opening defined by the insulated cabinet. The vacuum insulated structure further includes a pressure sensing device that is coupled to at least one of the metallic liner and the outer metallic wrapper. The pressure sensing device is disposed proximate the window and transmits a signal through the window to a receiver.

According to another aspect of the present disclosure, the window is made from a low gas permeability material, and the metallic liner and the outer metallic wrapper are each made of steel.

According to another aspect of the present disclosure, the low gas permeability material is plastic and the window is treated with a coating that minimizes gas permeation.

According to yet another aspect of the present disclosure, the window includes an overlap joint that is sealedly coupled to one of the metallic liner and the outer metallic wrapper, wherein the overlap joint comprises a sealant that significantly prevents gas from permeating through the overlap joint.

According to another aspect of the present disclosure, the window includes at least one groove and the insulated cabinet includes at least one flange that extends away from the interior surface. The at least one groove matingly accepts the at least one flange.

According to another aspect of the present disclosure, the window is configured to be incorporated into a trim breaker.

According to yet another aspect of the present disclosure, a vacuum insulated structure for thermal insulation in a refrigerating appliance includes a structural cabinet having an outer steel wrapper and a steel liner that form an insulating cavity therewithin. At least one strain gauge is attached to an interior surface of the structural cabinet and within the insulating cavity. The at least one strain gauge transmits a signal through one of the outer steel wrapper and steel liner via a wireless network to at least one of a control board and receiver.

According to another aspect of the present disclosure, the at least one strain gauge detects strain in at least one of the outer steel wrapper and steel liner caused by a change in gas pressure differential.

According to another aspect of the present disclosure, the at least one strain gauge is positioned on the steel liner.

According to yet another aspect of the present disclosure, the structural cabinet includes a window that is sealedly coupled to at least one of the outer steel wrapper and steel liner proximate the at least one strain gauge.

According to another aspect of the present disclosure, the one or more strain gauges wirelessly transmit the signals via at least one of Wi-Fi and a cloud-based network.

According to another aspect of the present disclosure, the one or more strain gauges transmit at least one of a wired signal and wireless signal to a refrigerator control board or a receiver.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. An insulating structure comprising:
   a plurality of metallic walls that are attached together to define an insulating cavity therein; and
   a pressure sensing device disposed within the insulating cavity, wherein the pressure sensing device is located to detect a pressure status and transmit the pressure status, via an antenna disposed within the insulating cavity, through a portion of the plurality of metallic walls.

2. The insulating structure of claim 1, wherein the plurality of metallic walls are made of steel.

3. The insulating structure of claim 1, wherein the plurality of metallic walls at least partially defines a thermally insulated storage compartment.

4. The insulating structure of claim 1, wherein the pressure sensing device is paired with a transmitter that includes the antenna, wherein the transmitter is configured to transmit the pressure status from the insulating cavity and through a wall of the plurality of metallic walls.

5. The insulating structure of claim 1, wherein the insulating cavity defines a partial vacuum.

6. The insulating structure of claim 1, wherein an insulation material is disposed within the insulating cavity.

7. The insulating structure of claim 1, wherein the pressure sensing device detects a change in at least one wall of the plurality of metallic walls caused by a change in an amount of gas within the insulating cavity.

8. The insulating structure of claim 7, wherein the pressure status is a pressure-related reading.

9. The insulating structure of claim 7, wherein the pressure status is a deflection-related reading.

10. The insulating structure of claim 1, wherein the pressure sensing device transmits a wireless signal of the pressure status to at least one of a refrigerator control board and a receiver.

11. A vacuum insulated structure comprising:
a plurality of metallic walls attached together to define an insulating cavity therein;
a window disposed within a window wall of the plurality of metallic walls, the window configured to allow a wireless signal to pass therethrough, wherein the window is sealedly coupled to an opening defined by the window wall; and
a pressure sensing device having an antenna that is coupled to an interior surface of the window wall, wherein the pressure sensing device is disposed proximate the window and transmits a signal, using the antenna, through the window to a receiver.

12. The vacuum insulated structure of claim 11, wherein the window is made from a low gas permeability material, and wherein the window wall is made of steel.

13. The vacuum insulated structure of claim 12, wherein the low gas permeability material is plastic and the window is treated with a coating that minimizes gas permeation.

14. The vacuum insulated structure of claim 11, wherein the window includes an overlap joint that is sealedly coupled to the window wall, wherein the overlap joint comprises a sealant that significantly prevents gas from permeating through the overlap joint.

15. The vacuum insulated structure of claim 11, wherein the window comprises at least one groove, and the window wall comprises at least one flange that extends away from the interior surface, wherein the at least one groove matingly accepts the at least one flange.

16. A vacuum insulated structure for thermal insulation, the vacuum insulated structure comprising:
a plurality of steel walls that are attached to define a structural cabinet having an insulating cavity defined therebetween; and
at least one strain gauge attached to an interior surface of a wall of the plurality of steel walls, the at least one strain gauge configured to transmit a signal using an antenna disposed within the insulating cavity, wherein the antenna transmits the signal through the wall via a wireless network to at least one of a control board and a receiver.

17. The vacuum insulated structure of claim 16, wherein the at least one strain gauge detects strain at least in the wall caused by a change in gas pressure differential.

18. The vacuum insulated structure of claim 16, wherein the wall of the plurality of steel walls includes a window that is sealedly coupled thereto, proximate the at least one strain gauge.

19. The vacuum insulated structure of claim 16, wherein the at least one strain gauge wirelessly transmits the signal via at least one of Wi-Fi and a cloud-based network.

20. The vacuum insulated structure of claim 16, wherein the at least one strain gauge transmits at least one of a wired signal and a wireless signal to the control board or the receiver.

* * * * *